Patented Aug. 21, 1923.

1,465,834

UNITED STATES PATENT OFFICE.

EVALD ANDERSON, OF LOS ANGELES, CALIFORNIA, ASSIGNOR, BY MESNE ASSIGNMENTS, TO WESTERN PRECIPITATION COMPANY, A CORPORATION OF CALIFORNIA.

PROCESS FOR RECOVERING POTASSIUM COMPOUND IN CONNECTION WITH CEMENT MANUFACTURE.

No Drawing.  Application filed June 6, 1917. Serial No. 173,109.

*To all whom it may concern:*

Be it known that I, EVALD ANDERSON, a subject of the King of Sweden, and a resident of Los Angeles, in the county of Los Angeles and State of California, have invented a new and useful Process for Recovering Potassium Compound in Connection with Cement Manufacture, of which the following is a specification.

In the manufacture of cement, there is, in many cases, considerable potassium compound present in the fumes passing from the cement kilns, and the present invention relates to recovery of such potassium compound from said fumes, the main object of the invention being to provide for such recovery in the most effective and economical manner. In many cases, the potassiferous constituent of the dust is not freely soluble in water, and there is a tendency for a considerable proportion of the potassium compound to remain in the residue on leaching, and an important object of the present invention is to provide for eventual recovery of the potassium content in the residue in leaching, in addition to the portion dissolved.

In the art of producing potassium compound from cement forming materials by volatilization in the kilns of the potassiferous constituent of the raw mix, it has been found that the addition of NaCl, or other chloride-bearing salts, either to the powdered coal, or to the raw mix, increases materially the percentage liberated in water soluble form in the kilns. The material so volatilized subsequently condenses to form a fume or dust, which may be collected in any suitable manner—for example, by electrical precipitation.

I have found that treatment of this dust with water, preferably hot, followed by filtration, preferably hot, to remove the non-soluble constituents, yields a solution containing a large percentage of the potassium compound, together with the soluble sodium chloride and other soluble salts present, and from this is produced by the usual methods of crystallization and evaporation, a potassium salt, rich enough in potassium to meet the requirements of the chemical and fertilizer trade.

By my process, it is not required for the final complete recovery of the potassiferous constituent in the collected dust and fume, that the separation of the potassium compound be complete, either from the solids resulting from filtration, or from the residual liquor from potassium salt crystallizing in the filtrate, and in general, it will be more economical, and permit of greater productive capacity for a given plant, if the separation is only carried through a major fraction thereof. To enable final extraction to be complete, I provide for the return of the residue resulting from filtration, to the kiln feed, whereas the material enters the hot zone, the non-volatile constituent is burned to cement clinker, and the volatile potassium salt and other volatile constituents, are vaporized, and finally collected as a cyclic operation in the previously mentioned dust collecting method.

My process may be carried out as follows:

Raw mix, having an appreciable potassium content, and comprising, for example, a lime shale mixture, in which the shale contains some potassium compound, and with or without enrichment with feldspar or other comparatively high potassiferous material, for increasing the potassium content of the mix, is heated in the ordinary cement kilns, the mix being either "dry" ground or "wet" ground, and supplied to the kilns, either in dry condition, or as a slurry, and the calcining and clinkering of the mix being effected in a rotary kiln by means of fuel burners, using either oil or pulverized coal, or other fuel, and operation being carried on at such temperature as to produce clinker of the desired quality and to volatilize a considerable proportion of the potassium content of the raw mix. In order to increase the amount of such volatilization, I prefer to add sodium chloride or equivalent material, either to the raw mix, or to the fuel. Obviously an excess of sodium chloride may be used and such excess of sodium chloride is not wasted, since it is recovered in the cyclic process hereinafter described. For example, in the case of powdered coal used as fuel, the same may be moistened with a solution of sodium chloride and then dried, or the sodium chloride may be mixed dry with the raw mix, or may be applied to the raw mix in the form of a solution, the amount of sodium chloride used being, for example, about equal to the potassium content calculated as $K_2O$ in the raw mix. The sodium chloride used for this purpose may be supplied, in part, at least, as a constituent of residual liquor after crystallizing out potassium compound from the solution produced by leaching the kiln dust, as hereinafter set forth. I prefer to supply the sodium chloride both to the raw mix and to the fuel feed, especially when powdered coal is used as a fuel, as I thereby obtain maximum recovery of potassium compound in soluble form. The addition of sodium chloride to the raw mix increases the amount of potassium volatilized and also decreases, to some extent, the formation of difficultly soluble potassium compounds, due, for example, to reaction of siliceous coal dust ash with the volatilized potassium compound. By supplying an additional quantity of sodium chloride with the fuel, for example, as a coating on powdered coal fuel, I obtain a still further increase in the amount of soluble potassium compound in the dust. Under suitable conditions of temperature and time of heating, it has been found that most of the potassium content of the raw mix can be volatilized at temperatures and time of heating adapted for production of cement clinker, particularly when sodium chloride is added in proper amount. The material so volatilized is largely condensed in the outlet flues of the kiln, and may be collected by any suitable means—for example, by electrical precipitation, as set forth in patent to W. A. Schmidt—No. 1,200,887, dated October 10, 1916. The dust or fume so collected is subjected to a leaching operation, in any suitable apparatus, preferably by means of hot water, which may be either fresh water, or water contained in mother liquor returned to the cycle as hereinafter set forth, the temperature of the water being, for example, from 50° to 100° C., according to the time permitted for leaching, and the amount of heat available, it being well understood that the rapidity of solution or extraction of the soluble potassium salt from the dust, is greater with hot water than with cold water. It is not necessary, however, in my process to maintain the heat of the solution throughout the leaching operation, or during the subsequent filtering, as the presence of a considerable proportion of the potassium content in the undissolved residue does not interfere seriously with the economy of the process. The solution is separated from the undissolved residue by decantation, filtering or otherwise, and is then treated in suitable manner for the recovery of the dissolved salts contained therein—for example, the solution may be evaporated to dryness, or it may be evaporated and then cooled so as to cause the potassium salt to crystallize out.

The mother liquor resulting from the precipitation of potassium salts in the economical time and treatment given thereto, but still containing essential quantities of potash salt, is for final complete collection of its potassium content, returned in "wet" grinding plants, direct to grinders, or is utilized in wetting the coal fuel previous to drying and grinding, and in "dry" grinding plants, either passing as in previous case, to the coal feed, or after evaporation, to the dry grinders, or to the kiln feed head. Or, the mother liquor may be used as a dissolving agent, being returned to the cycle at that stage of the operation where the solubles are being dissolved. In that case, a portion of such mother liquor may be bled off, as required, to prevent undue accumulation of salts other than potassium salts therein, and the portion so bled off may be returned to the heating stage of the cycle in the manner stated.

The undissolved residue containing, in general, more or less of the potassium content of the dust, is returned to the raw mix so as to be utilized in cyclic repetition of the process. In this manner, there is no waste or loss of potassium content, either in the residual liquor or in the residual solids, and it is not necessary to provide for extremely high recovery of potassium salt, either from the liquor or from the dust, as a whole, the percentage of recovery for most economical operation being determined in each case by the special conditions of operation.

In case sodium chloride or other chloride is used for increasing the amount of potassium compound volatilized, and for increasing the solubility of the resulting potassium compound in the material passing off from the furnace or kiln, the above described process has the advantage that any excess of sodium chloride used (such excess of sodium chloride being recovered either as crystallized salt in evaporation of the solution precedent to cooling for separation of potassium chloride, or as a constituent of the residual liquor), and all the chlorides, other than the potassium salt separated from the solution obtained from such material, are returned to the cycle either in the raw mix or in the fuel, so that the process result in the greatest economy in the use of such sodium chloride or equivalent agent as well as in maximum recovery of potash.

While the process is especially intended for use where sodium chloride or equivalent material is used for increasing the volatilization of potassium compound from the raw mix, and where the potassium in the volatilized material is largely in the form of chloride, it is also applicable to cases where the potassium occurs, partly or wholly, in other forms, such as sulfate, carbonate or sulfide.

In extraction of potassium compound from cement kiln dust, it is desirable that the water used for extraction should be as hot as practicable, say about 100° C., in order to expedite the dissolving action, but it is not necessary to maintain the solution at this temperature while it is being separated from the solid material by filtration and the temperature will, in general, fall considerably before the solution passes the filter. On account of the lime present in cement kiln dust, there may be a tendency for part of the potassium compound to remain undissolved under such conditions, due to formation of comparatively insoluble double salts, this being particularly the case where the potassium is present, partly or wholly, as sulfate, (by reason, for example, of sulfur in the fuel,) but as such undissolved material is returned to the cycle as above described, there is no resulting loss of potassium values. Under some conditions, a considerable proportion of the potassium compound is in comparatively insoluble form, this being especially the case where powdered coal is used as fuel and where the resulting siliceous ash reacts with the potassium vapors to form difficultly soluble compounds. By using hot water, a considerable proportion of such compounds may be dissolved in a period permitted by practical operation, and any portion remaining undissolved is eventually returned to the cycle, as above described, so that the potash is substantially all recovered.

The above described process is also applicable to the recovery of potassium compound in cases where raw mix containing potassium compound is subjected to a fusing heat, and the resulting fused material is either molded into blocks, etc., or is further treated for production of cement, and in such cases it may be carried out with or without the use of sodium chloride or equivalent material in the raw mix.

That feature of my present process, which consists in addition of sodium chloride, or other chlorides, both to the raw mix and to the powdered coal fuel, in order to produce maximum amount of water soluble potassium compound in the kiln dust, is of advantage even in cases where the dust is not subjected to a leaching operation, but is sold or used, for example, as a fertilizer, for its water soluble potassium content.

What I claim is:—

1. The process which consists in subjecting a mixture of calcareous material, siliceous material containing potassium compound, and sodium chloride, to sufficient heat to drive off potassium compound in the form of chloride, dissolving such chloride by the action of water, removing the resulting solution from undissolved residue, separating potassium compound from such solution, and returning undissolved residue and mother liquor of the solution to the heating stage of the process in cyclic repetition thereof.

2. The process which consists in subjecting potassiferous cement raw mix together with sodium chloride, to sufficient heat to drive off material containing potassium compound, dissolving solubles in the material driven off, by the action of water, removing the solution from the residue, separating potash from said solution and returning the residue to the heating stage of the process in cyclic repetition thereof.

3. The process which consists in subjecting potassiferous cement raw mix together with sodium chloride to sufficient heat to drive off material containing potassium compound, subjecting the material so driven off to the action of water, separating potassium compound from the resulting solution and returning remaining dissolved material to the heating stage of the process in cyclic repetition thereof.

4. The process which consists in subjecting raw mix of calcareous and siliceous material containing potassium, to sufficient heat to drive off materials containing potassium compound, subjecting the material so driven off to the action of water, removing the resulting solution from the undissolved residue, returning such residue to raw mix for repetition of the process, separating potassium compound from aforesaid solution, and returning mother liquor of the solution, partly to the dissolving and partly to the heating stage in the cycle of operations.

5. The process which consists in subjecting raw mix of calcareous and siliceous material containing potassium, to sufficient heat to drive off materials containing potassium compound, subjecting the material so driven off to the action of water, removing the resulting solution from the undissolved residue, separating potassium compound from aforesaid solution and returning mother liquor of the solution to the heating stage in the cycle of operations.

6. The process which consists in subjecting raw mix of calcareous and siliceous material containing potassium, to sufficient heat to drive off materials containing potassium compound, subjecting the material so driven off to the action of water, removing the resulting solution from the undissolved residue, returning such residue to the heating stage of the process, separating potassium compound from resulting solution, and returning mother liquor of the solution to the heating stage of the process.

7. The process which consists in subjecting potassiferous cement raw mix together with sodium chloride to sufficient heat to drive off material containing potassium compound, subjecting the material so driven off to the action of water to dissolve sodium and potassium compounds, including sodium chloride, treating the resulting solution to recover, separately, potassium compound and sodium chloride and returning such sodium chloride to the heating stage of the process in cyclic repetition thereof.

8. The process which consists in subjecting cement kiln dust containing potassium and sodium chlorides to the action of hot water, to dissolve said chlorides, removing the resulting solution from the solid residue, and treating the resulting solution to recover potassium chloride therefrom.

9. The process which consists in subjecting cement kiln dust containing potassium and sodium chlorides to the action of hot water to dissolve such chlorides, removing the resulting solution from the undissolved material, and treating the resulting solution to separately recover sodium chloride and potassium chloride.

10. In the recovery of potassium chloride as a by-product in cement-making, the step of adding NaCl in excess to potassiferous cement-making raw mix, volatilizing the major part of the potash content and the excess of NaCl, separating the NaCl from the volatilized products and then adding such separated NaCl to a further amount of the raw mix.

11. In the recovery of potassiferous by-products in cement-making, the step of adding to a potassiferous raw mix, an excess of an agent capable of aiding volatilization of the potassium content of the mix, then heating to volatilize the potassium in the form of a potassium compound, and to volatilize such excess of such agent, recovering the so volatilized potassium compound and such excess of agent, and adding such excess of agent to a further quantity of such cement raw mix.

12. In a manufacture of cement and recovery of potassiferous by-products, the step of heating to a clinkering temperature, a mixture comprising potassium-bearing cement-making raw materials and sodium chloride in excess of an amount of the potassium compounds present.

In testimony whereof I have hereunto set my hand, at Los Angeles, California, this 29th day of May, 1917.

EVALD ANDERSON.